(12) United States Patent
Mineta et al.

(10) Patent No.: US 8,814,268 B2
(45) Date of Patent: Aug. 26, 2014

(54) VEHICLE SEAT AND CLIP

(75) Inventors: Yuji Mineta, Toyota (JP); Kunio Nishiyama, Okazaki (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 155 days.

(21) Appl. No.: 13/494,238

(22) Filed: Jun. 12, 2012

(65) Prior Publication Data

US 2012/0319448 A1     Dec. 20, 2012

(30) Foreign Application Priority Data

Jun. 14, 2011   (JP) ................................ 2011-131884

(51) Int. Cl.
| | | |
|---|---|---|
| *A47C 31/00* | (2006.01) | |
| *B60R 13/01* | (2006.01) | |
| *B60N 2/36* | (2006.01) | |
| *B60N 2/58* | (2006.01) | |
| *B60N 2/30* | (2006.01) | |
| *B60N 2/60* | (2006.01) | |

(52) U.S. Cl.
CPC .......... *B60N 2/6009* (2013.01); *B60R 13/011* (2013.01); *B60N 2/36* (2013.01); *B60N 2/5825* (2013.01); *B60N 2/3009* (2013.01); *B60N 2/5833* (2013.01); *B60N 2002/363* (2013.01)
USPC .................................................... 297/228.13

(58) Field of Classification Search
USPC ................. 297/228.13, 219.1, 452.38, 463.1, 297/452.1
See application file for complete search history.

(56) References Cited

U.S. PATENT DOCUMENTS

| | | | | |
|---|---|---|---|---|
| 659,251 | A | * | 10/1900 | Nerad ......................... 297/218.3 |
| 3,103,082 | A | * | 9/1963 | Baermann ................ 297/452.48 |
| 3,408,105 | A | * | 10/1968 | Portell ....................... 297/452.58 |
| 4,037,296 | A | * | 7/1977 | White et al. ................. 24/114.3 |
| 5,302,001 | A | * | 4/1994 | van Dis ..................... 297/228.13 |
| 5,401,075 | A | * | 3/1995 | Venuto et al. ............. 297/218.2 |
| 5,653,503 | A | * | 8/1997 | Taggart ..................... 297/218.5 |
| 5,964,017 | A | * | 10/1999 | Roberts ..................... 297/218.1 |
| 5,974,636 | A | * | 11/1999 | Brown et al. .................. 24/615 |
| 6,152,534 | A | * | 11/2000 | Maeda et al. ............. 297/218.3 |
| 6,206,467 | B1 | * | 3/2001 | Mense et al. ............. 297/218.2 |
| 6,273,656 | B1 | * | 8/2001 | Cleland et al. ................. 411/45 |

(Continued)

FOREIGN PATENT DOCUMENTS

| | | |
|---|---|---|
| CN | 2463229 | 12/2001 |
| JP | 2001231656 | 8/2001 |

OTHER PUBLICATIONS

U.S. Appl. No. 13/469,448 to Kouta Yamamoto et al., filed May 11, 2012.

(Continued)

*Primary Examiner* — Jose V Chen
(74) *Attorney, Agent, or Firm* — Greenblum & Bernstein, P.L.C.

(57) ABSTRACT

There is provided a vehicle seat including a backboard attached to a rear surface of a seat back, a skin material covering a rear surface of the backboard, and a clip attaching the backboard to a body portion of the seat back. The clip integrally includes a board engaging portion which is engageable with the backboard, a seat engaging portion which is engageable with the body portion of the seat back, and a skin engaging portion which is engageable with the skin material. The skin material and the backboard are attached to the body portion of the seat back by the clip.

6 Claims, 4 Drawing Sheets

(56) References Cited

U.S. PATENT DOCUMENTS

| | | | |
|---|---|---|---|
| 6,554,363 B1 * | 4/2003 | Silva | 297/482 |
| 7,481,489 B2 * | 1/2009 | Demick | 297/218.1 |
| 7,559,100 B2 * | 7/2009 | Pedde et al. | 297/218.2 |
| 7,752,720 B2 * | 7/2010 | Smith | 24/297 |
| 7,807,244 B2 * | 10/2010 | Line | 24/442 |
| 2012/0274116 A1 * | 11/2012 | Palmer | 297/452.38 |

OTHER PUBLICATIONS

Chinese Office Action dated Mar. 5, 2014, along with English-language translation thereof.

* cited by examiner

VEHICLE SEAT AND CLIP

BACKGROUND OF THE INVENTION

1. Field of the Invention

The present invention relates to a vehicle seat and a clip. More specifically, the present invention relates to a vehicle seat including a backboard attached to a rear surface of a seat back and a skin material covering a rear surface of the backboard, and a clip used in the vehicle seat.

2. Description of the Related Art

There have been known a vehicle seat including a backboard made of a woody fiber substrate attached to a rear surface of a seat back, and a skin material covering the backboard from a rear side (see JP 2001-231656A). The backboard is attached to a seat back frame by a clip having a hook. The skin material is attached to a peripheral portion of the backboard by a tucker or an adhesive, so that the skin material is fixed to the seat back frame.

However, according to the vehicle seat disclosed in JP 2001-231656A, a clip for attaching the backboard and a member for attaching the skin material are separately provided, thereby increasing the number of necessary components.

SUMMARY OF THE INVENTION

The present invention has been made in view of the above circumstances, and an object of the present invention is to simplify configuration of attaching a backboard and a skin material to a seat back and a clip used in the configuration.

According to an illustrative embodiment of the present invention, there is provided a vehicle seat including a backboard attached to a rear surface of a seat back, a skin material covering a rear surface of the backboard, and a clip attaching the backboard to a body portion of the seat back. The clip integrally includes a board engaging portion which is engageable with the backboard, a seat engaging portion which is engageable with the body portion of the seat back, and a skin engaging portion which is engageable with the skin material. The skin material and the backboard are attached to the body portion of the seat back by the clip.

According to the above configuration, since the clip for attaching the backboard to the seat back is formed integrally with the skin engaging portion to be engaged with the skin material, it is possible to attach the backboard and the skin material to the body portion of the seat back. By using the clip having this engaging structure, it is possible to simplify the configuration of attaching a backboard and a skin material to a seat back.

In the above vehicle seat, the skin engaging portion of the clip may include a hook surface of a surface fastener having a plurality of hook-shaped raised naps which are entangled to be caught in fibers of the skin material.

According to this configuration, since the skin engaging portion includes the hook surface of a surface fastener, which are entangled to be caught in fibers of the skin material, it is possible to obtain a simple configuration capable of engaging the skin material by bringing the skin material in contact with the clip, without adding any special engaging structure to the skin material. Since the skin engaging portion is formed in the shape of thin member having raised naps entering and entangling in a fiber net of the skin material, it is possible to decrease protrusion from the rear surface of the backboard, and therefore, finished appearance of the skin material can be favorable when the backboard is covered by the skin material.

In the above vehicle seat, the board engaging portion of the clip may be engaged with the backboard by inserting a narrow thickness portion formed on the board engaging portion into a mounting hole formed in the backboard and shifting the narrow thickness portion transversely in a plane direction of the backboard to fit the narrow thickness portion into the narrow hole, so that the board engaging portion is integrally mounted to the backboard in an insertion/separation direction. And, the seat engaging portion of the clip may be engaged with the body portion of the seat back, in a state where the board engaging portion is engaged with the backboard, by inserting a wire member which is integrally engaged with a framework forming the body portion of the seat back, into the seat engaging portion protruding in a front side of the backboard, so that the seat engaging portion is resiliently engaged with the wire member.

According to the above configuration, the board engaging portion of the clip is attached to the backboard by inserting the narrow thickness portion into the mounting hole formed in the backboard and shifting the narrow thickness portion transversely (plane direction of the backboard) to fit the narrow thickness portion into the narrow hole. In addition, since the seat engaging portion of the clip receives the wire member integrally engaged with the seat back frame, the seat engaging portion is resiliently engaged with the wire member. By employing the engaging structure, it is possible to easily carry out the attachment of the clips to the backboard or the attachment of the backboard to the seat back by the clips.

According to another illustrative embodiment of the present invention, there is provided a clip used in a vehicle seat including a backboard attached to a rear surface of a seat back, a skin material covering a rear surface of the backboard, and configured to attach the skin material and the backboard to the body portion of the seat back. The clip integrally includes a board engaging portion which is engageable with the backboard, a seat engaging portion which is engageable with the body portion of the seat back, and a skin engaging portion which is engageable with the skin material.

In the above clip, the skin engaging portion may include a hook surface of a surface fastener having a plurality of hook-shaped raised naps which are entangled to be caught in fibers of the skin material.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, illustrative embodiments of the present invention will now be described with reference to the accompanying drawings.

Figure 1:
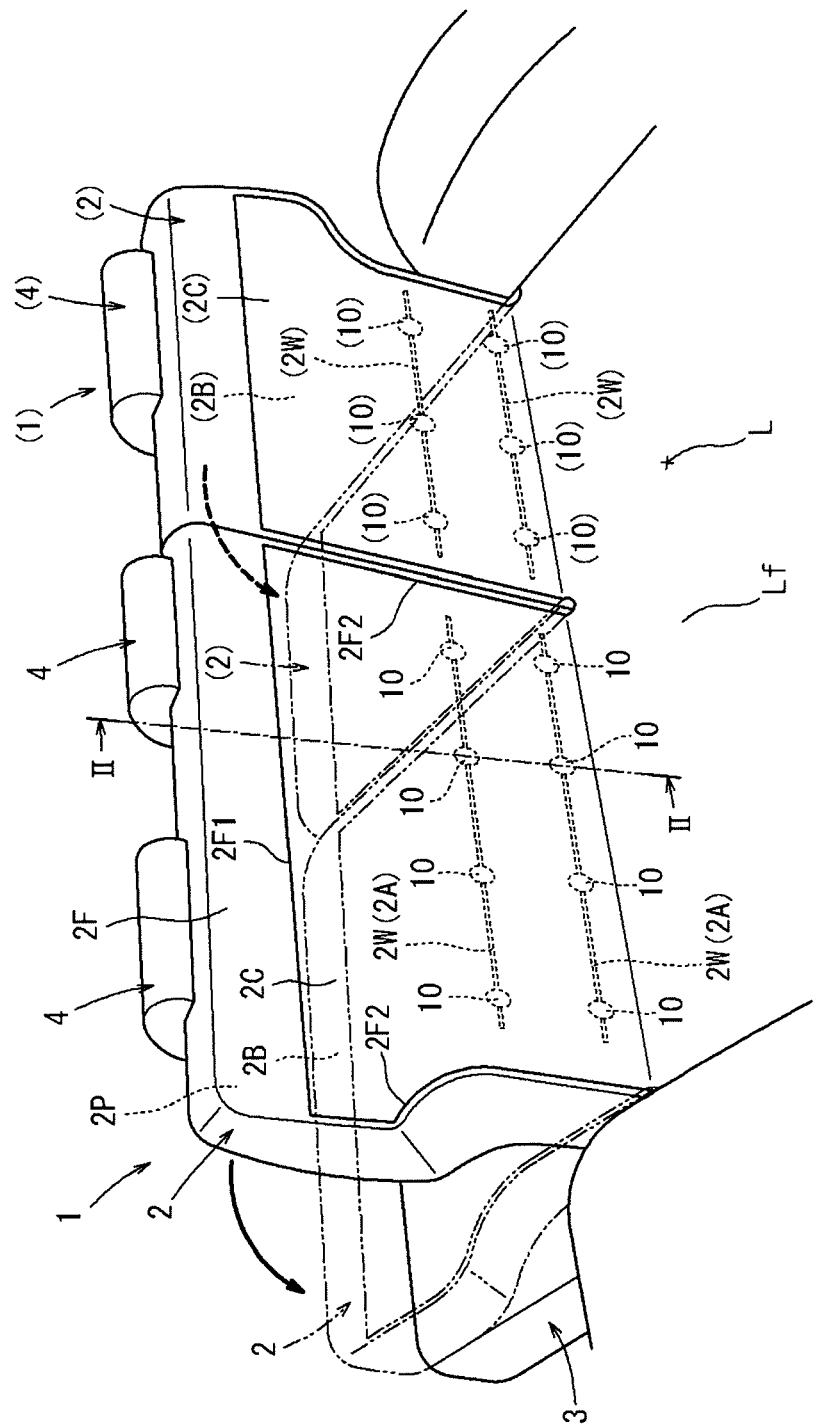
FIG. 1 is a perspective view schematically showing a configuration of a vehicle seat.

First, the configuration of a vehicle seat 1 according to an illustrative embodiment will be described with reference to FIGS. 1 to 4. The vehicle seat 1 according to this illustrative embodiment is configured as a seat for the last-row seat of a vehicle, as shown in FIG. 1. A luggage compartment L is provided at a rear side of the vehicle seat 1, and is continuous to a space of a passenger compartment. Also, the vehicle seat 1 is configured as a seat of a wide width among seats for three persons which are divided into two parts at the ratio of six to four in width on the same row. The vehicle seat 1 includes a seat back 2 configured as a backrest for a passenger, a seat cushion 3 configured as a seating portion, and a headrest 4 for supporting a head of the passenger. The fundamental structure of a seat of a narrow width next to the vehicle seat 1 is substantially same as that of the vehicle seat 1, and thus the detailed description thereof will be omitted herein.

The vehicle seat 1 includes a backboard 2B made of a woody fiber substrate attached to a rear surface of the seat back 2, and a sheet-like carpet 2C (an example of a skin material) covering the rear of the backboard 2B from a rear side. The carpet 2C is made of the same material as that of the carpet (not shown) laid on a floor surface Lf of the luggage compartment L. As shown by an imaginary line in FIG. 1, the carpet 2C is configured to form a floor surface, which is flush with the floor surface Lf to exhibit a sense of unity, by largely reclining the seat back 2 in a forward direction. The backboard 2B serves as a lining of the carpet 2C, when the seat back 2 is reclined forward and the rear surface thereof is used as the floor surface. The backboard 2B secures a structural strength of the rear portion of the seat back 2 when used as a place for loading luggage.

The backboard 2B is engaged and fixed to wire members 2W extending between frameworks (seat back frame 2A) of the seat back 2, by a plurality of clips 10. In addition, the carpet 2C covering the rear surface of the backboard 2B is engaged with a hook surface 13 of a hook-and-loop fastener, provided on the rear surface of the respective clips 10. The backboard 2B or the carpet 2C is held in the state where the backboard or the carpet is attached to the rear portion of the seat back 2 by the clips 10. Hereinafter, the more specific structure of the seat back 2 and the structure of attaching the backboard 2B or the carpet 2C to the seat back 2 by the clips 10 will be described in detail.

Figure 2:
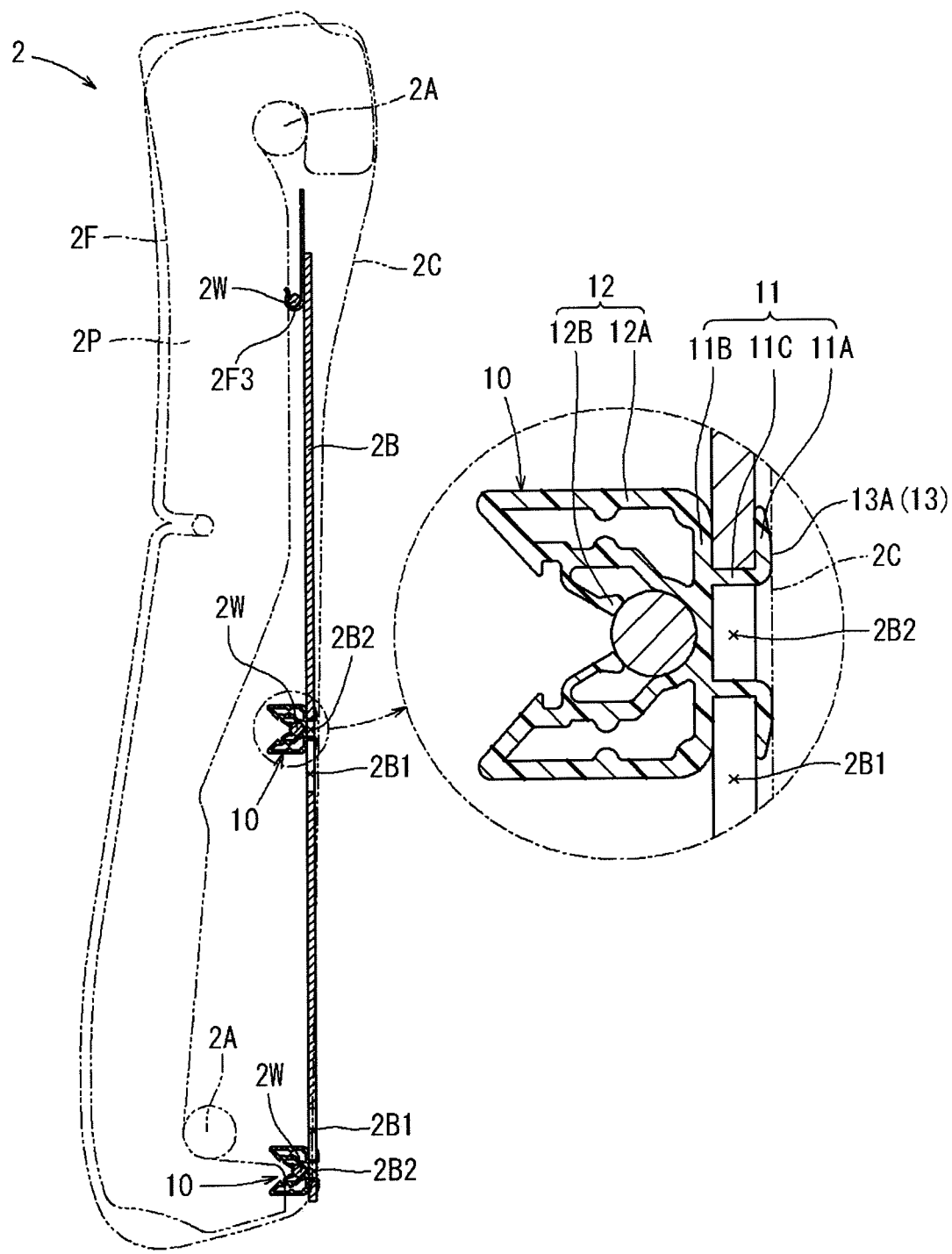
FIG. 2 is a cross-sectional view taken along a line II-II in FIG. 1.

As shown in FIG. 2, the seat back 2 includes a seat back frame 2A made of steel to form a framework, a cushion pad 2P made of foamed molding of urethane resin to form a cushion structure, and a skin cover 2F of a fabric surface shape to form a skin. The seat back frame 2A has an inverted U-shaped configuration, and both lower ends thereof are engaged with rear framework portions of both sides of the seat cushion 3, with a reclining device (not shown) serving as a rotary shaft device capable of locking and releasing the rotation of a shaft being interposed between the lower ends and the rear framework portions. The seat back 2 is normally held in a state where an angle of the backrest is fixed at a desired position, but the angle of the backrest can be properly adjusted or largely reclined forward, when desired.

The cushion pad 2P is provided to cover the entire outer circumference of the seat back frame 2A from the front side of the respective frame portions to the rear side. The cushion pad 2P is configured to softly receive the backrest load of a passenger through its cushion structure. The cushion pad 2P itself is supported from the rear side by the plurality of wire members 2W extending between the frames of the seat back frame 2A. The skin cover 2F covers the seat back frame 2A, which is covered by the cushion pad 2P, from the front side to the rear side. A peripheral portion of the skin cover 2F is fixed by hooking hook members 2F3 which are sewed on the respective peripheral portions, on the wire member 2W extending between the frames of the seat back frame 2A, thereby holding the skin cover in a stretched state while the skin cover covers the whole surface of the seat back 2.

As shown in FIGS. 1 and 2, an upper edge of the carpet 2C is sewed on the lower peripheral portion (sewed portion 2F1) of the surface portion of the skin cover 2F, which covers the upper surface portion of the seat back 2 from the front side to the rear side. After the seat back 2 is covered by the skin cover 2F, edges of both sides of the carpet 2C are fastened to edges of both sides of the skin cover 2F, respectively, by linear fasteners 2F2, so that the carpet 2C is flush with the skin cover 2F. Each peripheral portion of the skin cover 2F is fixed to the seat back 2 so as not to flap in a state where the skin cover covers the rear surface of the seat back 2. Meanwhile, the lower edge of the carpet 2C is fixed to the wire member 2W extending between the frames of the seat back frame 2A by the hook members (not shown) sewed on the edge so as to be flush with the peripheral portion of the skin cover 2F.

Accordingly, the carpet 2C is attached to cover the backboard 2B which is beforehand attached to the rear surface of the seat back 2, from the rear side. After assembling, the carpet 2C is pressed and engaged with the hook surface 13 of the hook-and-loop fastener, which is formed on the rear surface of the respective clips 10 which attach the backboard 2B to the seat back frame 2A, by pressing several surface portions against the backboard 2B. Several surface portions of the carpet 2C are fixed to the seat back frame 2A by the respective clips 10, so that the carpet 2C is held by the respective clips 10 so as not to float upward from the backboard 2B or wrinkle in a plane direction.

Figure 3:
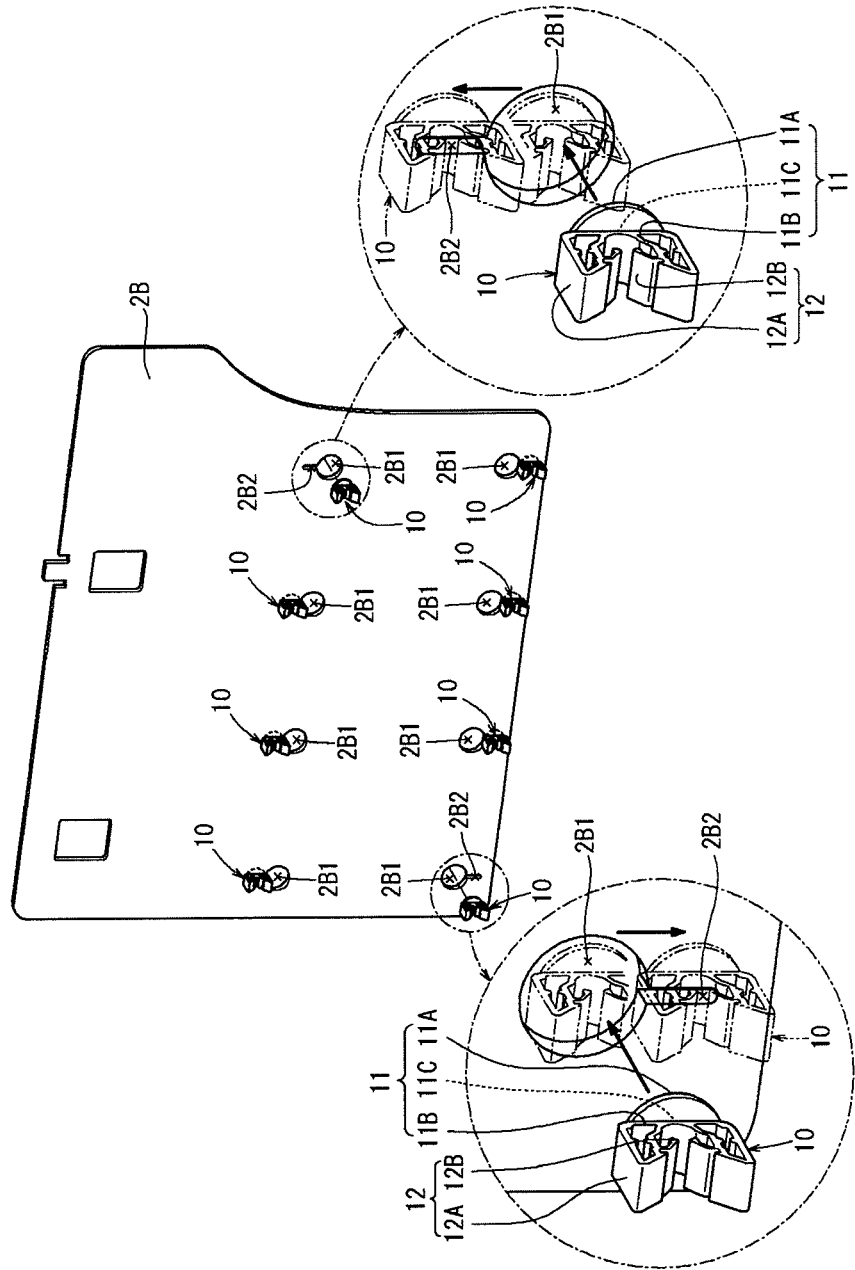
FIG. 3 is a perspective view showing a state where clips are attached to a backboard.

The configuration of the backboard 2B and clip 10 will be described. As shown in FIG. 3, the backboard 2B is made of a flat member which is cut to match the shape of the rear surface of the seat back 2. The backboard 2B is provided with circle-shaped mounting holes 2B1 for mounting four (eight in total) clips 10 in a widthwise direction, at each region of intermediate and lower sections in a height direction. These mounting holes 2B1 are sized such that a surface plate portion 11A (described later) of the clip 10 can be inserted in a plate thickness direction. A narrow hole portion 2B2 is formed to extend in a slit shape continuously from each mounting hole 2B1 from one position of a peripheral portion thereof. For the respective mounting holes 2B1 formed in the intermediate section of the backboard 2B in the height direction, the narrow holes 2B2 are formed to straightly extend in an upward direction from the respective mounting holes 2B1. For the respective mounting holes 2B1 formed in the lower section of the backboard 2B, the narrow holes 2B2 are formed to straightly extend in a downward direction from the respective mounting holes 2B1. The clip 10 is inserted into the mounting hole 2B1 and is slid into the narrow hole 2B2, thereby the narrow holes 2B2 prevents the clip 10 from moving in an insertion/separation direction (plate thickness direction) with respect to the backboard 2B.

Figure 4:
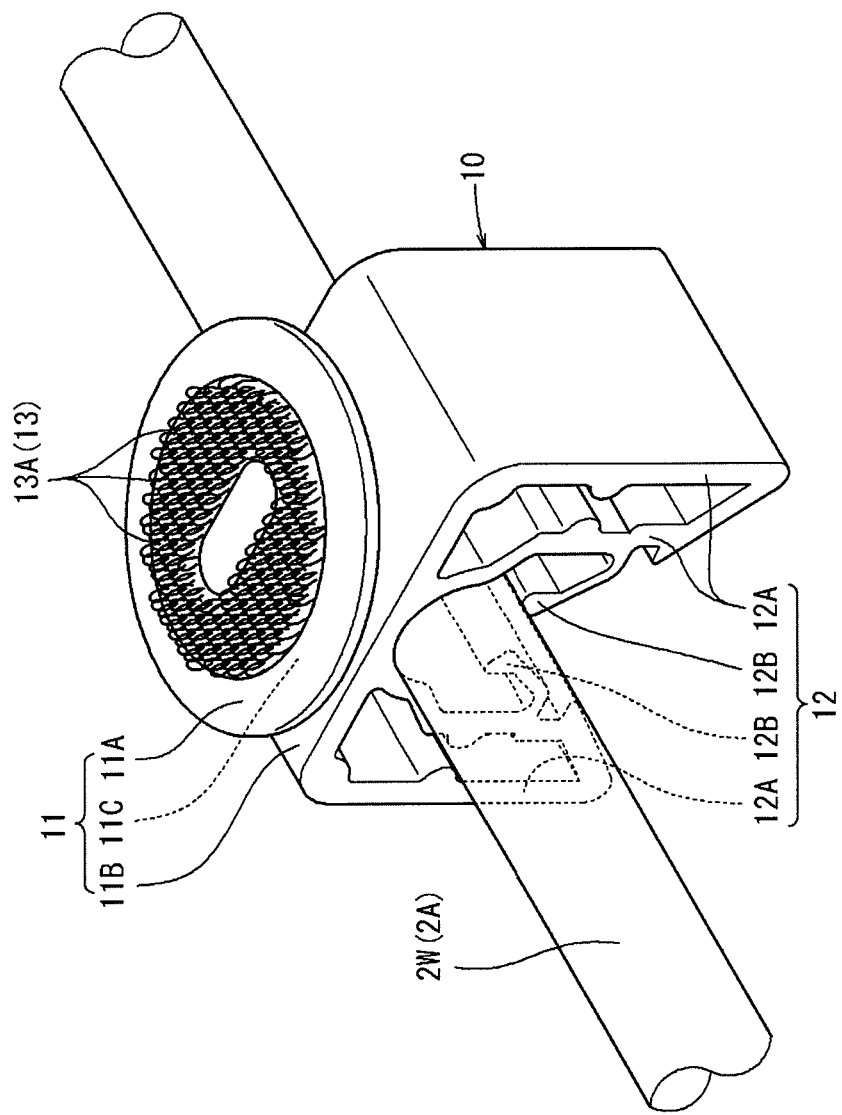
FIG. 4 is an enlarged perspective view showing a state where a clip is mounted on a wire member.

Next, the configuration of the clip 10 will be described. As shown in FIGS. 2 to 4, the clip 10 integrally includes a board engaging portion 11 mounted and engaged with the mounting hole 2B1 of the backboard 2B, a seat engaging portion 12 engaged with the wire member 2W (see FIG. 4) extending between the frames of the seat back frame 2A, and the hook surface 13 (an example of a skin engaging portion) of the hook-and-loop fastener which is engaged with the carpet 2C. The clip 10 is molded in a unitary body by a synthetic resin material such as polyamide or polyacetal. Specifically, the board engaging portion 11 of the clip 10 includes, as shown in FIGS. 2 and 3, the disc-shaped surface plate portion 11A, a seat portion 11B having a rectangular surface and facing the surface plate portion 11A, and a narrow thickness portion 11C formed between the surface plate portion 11A and the seat portion 11B.

A clearance dimension between the surface plate portion 11A and the seat portion 11B is set to be substantially equal to a plate thickness of the backboard 2B. The narrow thickness portion 11C has a rectangular cross-sectional shape fitted into the narrow hole 2B2 which extends continuously from the mounting hole 2B1 of the backboard 2B. The narrow thickness portion 11C is formed to have a width in plane narrower than that of the surface plate portion 11A and that of the seat portion 11B. The surface plate portion 11A is inserted into the mounting hole 2B1 together with the narrow width portion 11C, and then the narrow width portion 11C is slid in a longitudinal direction (plane direction of the backboard 2B) of its cross section until the narrow width portion 11C is fitted into the narrow hole 2B2. As a result, the backboard 2B is held in the plate thickness direction by the surface plate portion 11A and the seat portion 11B. The board engaging portions 11 are rigidly mounted in the plate thickness direction (insertion/separation direction) with respect to the backboard 2B by the holding structure of the surface plate portions 11A and the seat portions 11B.

In this instance, an engaging force of the board engaging portions 11 resulted by fitting the narrow thickness portions 11C into the narrow holes 2B2 may be secured by a press-fitting structure while the width of the narrow thickness portions 11C in the widthwise direction of its cross-sectional shape is set to be slightly larger than the hole width of the narrow holes 2B2. Alternatively, the engaging force may be secured by another press-fitting structure in which a width spaced between the surface plate portion 11A and the seat portion 11B is set to be slightly narrower than the plate thickness of the backboard 2B. When the clip 10 is mounted to the backboard 2B, as shown in FIGS. 2 to 4, the seat engaging portion 12 protrudes from the backboard 2B to the front surface of the seat. The clip 10 is resiliently hooked to the wire member 2W engaged with the seat back frame 2A.

Specifically, the seat engaging portion 12 includes upright wall portions 12A each provided upright from upper and lower portions of the seat portion 11B, and claw portions 12B protruding inward from the upright wall portions at an angle to face each other. Since the wire member 2W is sandwiched between the upright wall portions 2A, the claw portion 12B is pushed and bent by the wire member 2W, and then the wire member 2W is sandwiched at a position where the wire member comes into contact with the seat portion 11B. If the wire member 2W is sandwiched at the position, each claw portion 12B is resiliently returned to its original shape, and then presses and abuts against the rear surface of the wire member 2W sandwiched therebetween. As a result, the wire member 2W is resiliently held between the claw portions 12B and the seat portion 11B.

As shown in FIG. 4, the hook surface 13 is formed as a surface having a plurality of hook-shaped raised naps 13A which are entangled to be caught in fibers of the carpet 2C, formed on a rear surface of the surface plate portion 11A. The raised naps 13A of the hook surface 13 are formed by a so-called in-mold forming process. The raised naps 13A are directly formed on the rear surface of the surface plate portion 11A in a raising state. The hook surface 13 is exposed toward the rear surface of the backboard 2B in the state where the clips 10 are attached to the backboard 2B, as shown in FIG. 2. By pressing several surface portions of the carpet 2C covering the rear surface against the backboard 2B, the hook surfaces 13 are entangled to be caught by the fibers of the carpet 2C (fastening structure of the hook-and-loop fastener). Since the hook surface 13 is directly entangled and attached to the constituent of the carpet 2C, i.e. the fibers, it is possible to easily engage the carpet 2C to the clips 10, without adding any additional engaging structure.

According to the above-described vehicle seat 1, since each clip 10 for attaching the backboard 2B to the seat back 2 is formed integrally with the hook surface 13 engaged with the carpet 2C, it is possible to attach the backboard 2B and the carpet 2C to the seat back 2 by the clips 10. Use of the clips 10 having the engaging structure can achieve a simple configuration for attaching the carpet 2C to the seat back 2.

In addition, since the hook surface 13 of each clip 10 serving as a skin engaging portion is formed in the shape of thin member having raised naps 13A entering and entangling in a fiber net of the carpet 2C such that the hook surface 13 slightly protrudes from the rear surface of the backboard 2B, and therefore, finished appearance can be favorable when covered by the carpet 2C. In addition, the board engaging portion 11 of the clip 10 is mounted to the backboard 2B by inserting the narrow thickness portion 11C into the mounting hole 2B1 formed in the backboard 2B and shifting the narrow thickness portion 11C transversely (plane direction of the backboard 2B) to fit the narrow thickness portion 11C into the narrow hole 2B2. In addition, since the seat engaging portion 12 of the clip 10 receives the wire member 2W integrally engaged with the seat back frame 2A, the seat engaging portion 12 is resiliently engaged with the wire member 2W. By employing this engaging structure, it is possible to easily carry out the attachment of the clips 10 to the backboard 2B or the attachment of the backboard 2B to the seat back 2 by the clips 10.

In the above, an illustrative embodiment of the present invention has been described, however, the present invention may be modified into various forms other than the above-described illustrative embodiment. For example, in the above illustrative embodiment, the configuration using eight clips for attaching the backboard 2B or the carpet 2C to the seat back 2 has been illustrated. However, the number or size of the clips may be appropriately determined depending upon various set conditions such as size, shape or weight of the seat back (backboard).

In addition, the configuration of the seat engaging portion of each clip is not limited to the configuration which is engaged to the wire member 2W. Various engaging configurations which is inserted and engaged with the holes formed in the seat back frame or is hooked and engaged with an object, such as wire member, may be applied. Further, the object to be engaged with the seat engaging portion is not limited to the framework of the seat back. Various structures forming the body portion of the seat back may be intended as the object to be engaged. However, it is necessary to have the structural strength capable of supporting the backboard. Furthermore, the board engaging portion is not limited to the above configuration in which the board engaging portion is inserted into the mounting hole and then is shifted transversely (plane direction of the backboard) to fit the narrow thickness portion into the narrow hole. Various engaging configurations may be applied, in which the board engaging portion is resiliently hooked and engaged with the mounting hole by insertion, or may be pressed and fitted to the mounting hole by insertion. In addition, in the above illustrative embodiment, the carpet has been illustrated as an example of a skin material. However, as long as a sheet-like member can serve as a skin material, any sheet-like members can be used as the skin material, irrespective of the flexibility. Also, the skin engaging portion of the clip which is engaged with the skin material is not limited to the hook surface of the hookand-loop fastener. However, various engaging configurations may be used, in which concave and convex are frictionally engaged with each other on the skin material, or engaging portions are forcibly bitten by a portion of the skin material through pressing of the skin material.

What is claimed is:

1. A vehicle seat comprising:
a backboard attached to a rear surface of a seat back;
a skin material covering a rear surface of the backboard; and
a clip attaching the backboard to a body portion of the seat back,
wherein the clip integrally includes:
   a board engaging portion which is engageable with the backboard;
   a seat engaging portion which is engageable with the body portion of the seat back; and
   a skin engaging portion which is engageable with the skin material,
wherein the skin material and the backboard are attached to the body portion of the seat back by the clip, and
wherein the seat engaging portion is provided at a first side with respect to the board engaging portion, and the skin engaging portion is provided at an end face of the clip at a second side opposite to the first side with respect to the board engaging portion.

2. The vehicle seat according to claim 1,
wherein the skin engaging portion of the clip includes a hook surface of a surface fastener having a plurality of hook-shaped raised naps which are configured to be entangled in fibers of the skin material.

3. The vehicle seat according to claim 1,
wherein a narrow thickness portion provided on the board engaging portion engages a mounting hole provided in a plane direction of the backboard so that the board engaging portion is integrally mounted to the backboard in an insertion/separation direction, and
wherein the seat engaging portion of the clip is resiliently engaged with a wire member, which is integrally engaged with a framework defining the body portion of the seat back, and protrudes in a front side direction of the backboard.

4. A clip used in a vehicle seat including a backboard attached to a rear surface of a seat back, a skin material covering a rear surface of the backboard, and configured to attach the skin material and the backboard to the body portion of the seat back, the clip integrally comprising:
a board engaging portion which is engageable with the backboard;
a seat engaging portion which is engageable with the body portion of the seat back, the seat engaging portion including:
   upright wall portions that protrude from the board engaging portion toward a rear surface of the body portion of the seat back; and
   claw portions that protrude inwardly from the upright wall portions at an angle to face each other so as to resiliently retain a wire member therebetween; and
a skin engaging portion which is engageable with the skin material, wherein
the seat engaging portion is provided at a first side with respect to the board engaging portion, and the skin engaging portion is provided at an end face of the clip at a second side opposite to the first side with respect to the board engaging portion.

5. The vehicle seat according to claim 4,
wherein the skin engaging portion of the clip includes a hook surface of a surface fastener having a plurality of hook-shaped raised naps which are configured to be entangled in fibers of the skin material.

6. The vehicle seat according to claim 1, wherein the seat engaging portion comprises:
upright wall portions that protrude from the board engaging portion toward a rear surface of the body portion of the seat back; and
claw portions that protrude inwardly from the upright wall portions at an angle to face each other so as to resiliently retain a wire member therebetween.

\* \* \* \* \*